May 23, 1972  C. W. FLEIGHER  3,664,707
PAVEMENT SLICER

Filed Aug. 5, 1970  2 Sheets-Sheet 1

INVENTOR
CHARLES FLEIGHER
BY
Cesari and McKenna
ATTORNEYS

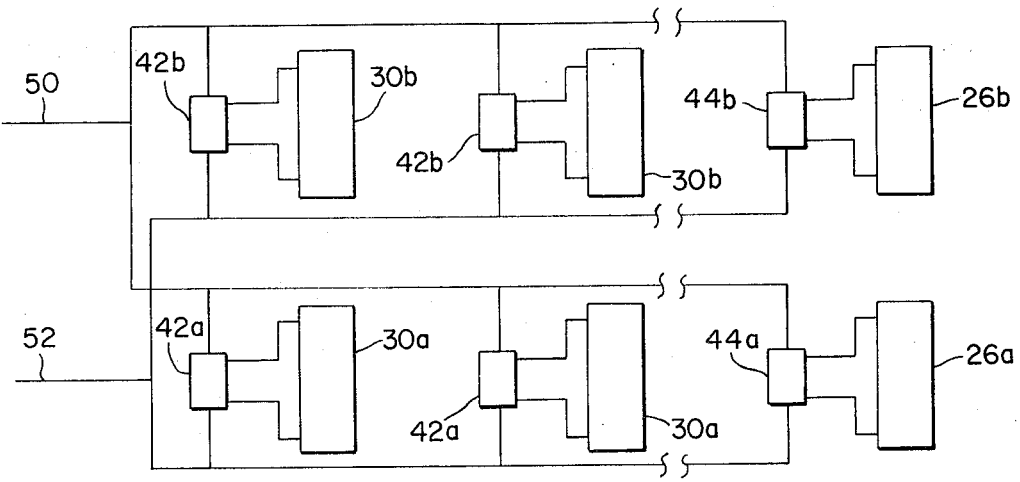
FIG. 4
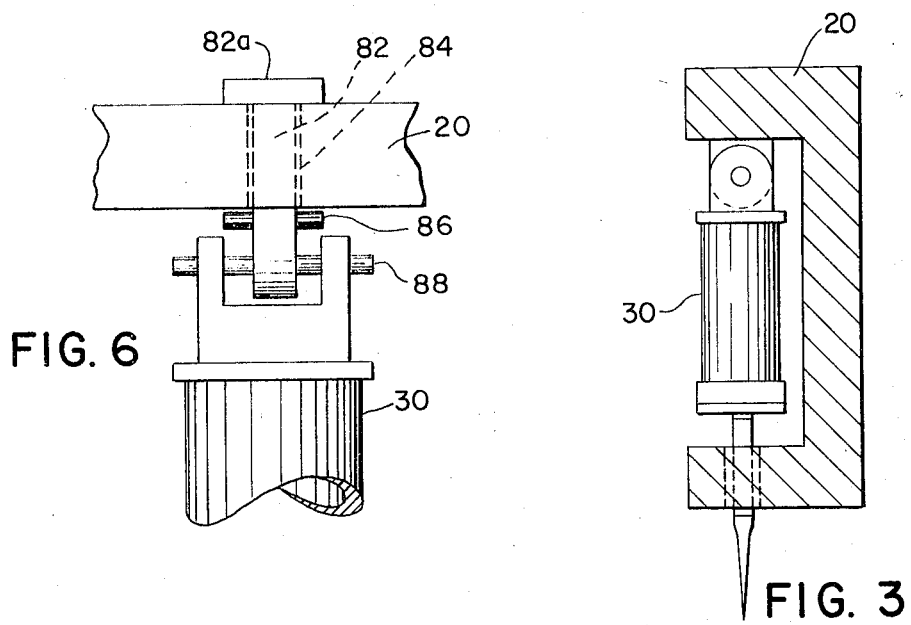
FIG. 6
FIG. 3
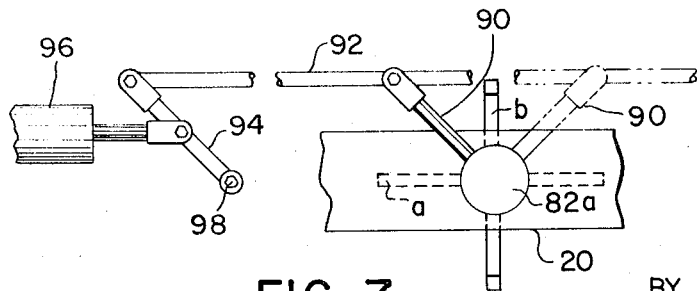
FIG. 7
INVENTOR
CHARLES FLEIGHER

United States Patent Office 3,664,707
Patented May 23, 1972

3,664,707
PAVEMENT SLICER
Charles W. Fleigher, Stoneham, Mass., assignor of a fractional part interest to Lloyd M. Gordon, Newton Center, Mass.
Filed Aug. 5, 1970, Ser. No. 61,136
Int. Cl. E01c *23/09*
U.S. Cl. 299—38                                14 Claims

ABSTRACT OF THE DISCLOSURE

A slicer for slicing through large sections of asphalt or other readily cuttable pavement material comprises a wheeled body which carries two rows of cutting blades driven by hydraulic actuators. The blades extend longitudinally along the body and are aligned end to end with each other so that a continuous cut equal to the total longitudinal extent of the blades may be made. Each blade is individually forced against and through the pavement by a single hydraulic actuator so that the overall length of the cut, as well as its depth, can readily be controlled. The position of the blades is adjustable from side to side to control the width of the slice.

BACKGROUND OF THE INVENTION

(A) Field of the invention

The invention relates to pavement cutters, and it comprises a pavement slicer for quickly cutting through a pavement with a minimum of noise.

(B) Prior art

A pavement cutter breaks up a selected portion of pavement to provide access to a road bed underneath. For example, the installation and repair of utilities which are generally located under sidewalks and roadbeds in cities requires the frequent breaking up of roadbed surfaces of varying lengths at different locations.

Currently, pavements are broken up typically by means of compressed-air-driven jack hammers. These are high speed reciprocating devices which, through compressed air, rapidly and repeatedly pound a chisel into the pavement. The noise level of these devices is extremely high and annoying to those in the immediate vicinity of the jack hammer. Further, a comparatively long time is required to break through pavement sections of extended length.

Asphalt pavements, which are relatively readily cuttable compared to pavements of such materials as concrete, for example, are sometimes cut through with the aid of a rotary cutter comprising a large diameter saw blade which is rapidly rotated against the pavement surface. Such cutters are much more silent than jack hammers and therefore less objectionable. However, the saw blade quickly becomes clogged with the material being cut and must frequently be cleaned to maintain its cutting action; this interrupts the cutting operation when large sections are to be cut and therefore unduly lengthens the time required to form the cut. In addition to clogging, the teeth of the saw rapidly wear and this further contributes to the inconvenience of this method of cutting through pavement.

BRIEF SUMMARY OF THE INVENTION

(A) Objects of the invention

Accordingly, it is an object of the invention to provide an improved machine for cutting pavement.

Further, it is an object of the invention to provide an improved pavement cutter which is relatively silent in its operation.

Another object of the invention is to provide an improved pavement cutter which rapidly forms cuts of desired length and width.

Yet another object of the invention is to provide an improved pavement cutter which is relatively quiet in operation and which does not require frequent cleaning of the cutting surfaces.

Still a further object of the invention is to provide an improved pavement cutter which is economical to construct and efficient to operate.

(B) Brief summary of the invention

The pavement cutter of the present invention is more accurately termed a pavement slicer since it breaks through the pavement by the slicing action of a plurality of blades which are aligned with each other in the direction of the cut to be made and which are individually actuated by hydraulic actuators at a controlled rate determined by the operator. The blades and their hydraulic actuators are divided into two separate groups, each group being attached to a corresponding frame on one side or the other of a wheeled bed on which the frames are mounted. The frames are slideable toward and away from each other on a set of tracks so that the distance between the two groups of blades can be varied by the operator in accordance with the desired width of the cut to be made.

Because each cutting blade is connected to a single hydraulic actuator, the blades may be driven against the pavement one at a time in order to generate the maximum cutting force on a given blade. This enables one to slice through pavements of substantial thickness and hardness with relative ease. To further increase the cutting action of the blades, they are formed such that their cutting edges are oriented at an angle with respect to the pavement surface; as the blade travels downwardly into the pavement during a cutting stroke, the cutting edge of the blade thus does not encounter the full resistance of the pavement along its entire edge but along only a portion thereof. This further increases the efficiency of the cutting operation.

As noted previously, the pavement slicer forms a cut strip whose length is determined by the number of blades which are actuated and whose width is equal to the spacing between the frames on which the blades are mounted. This strip is essentially a rectangular strip which is demarcated from the remainder of the pavement along the sides on which the blades have cut and is continuous with the pavement along the two remaining sides perpendicular to the line of blades. The cut segment may generally be readily removed by a bucket loader following the pavement slicer.

In some cases, it may be desirable to further break up the rectangular slice with the pavement slicer prior to the subsequent loading operations. This may readily be accomplished in accordance with an alternative embodiment of the invention in which the hydraulic actuators driving the individual blades are rotatably mounted on their respective frames so that the blades may be turned through an angle of 90° with respect to their normal position. Further slices may then be made within the rectangle to more fully break up the pavement surface.

A control console is mounted on the wheeled bed to enable the operator to control the cutting action from a central location. The console includes controls for setting the depth of cut of each of the blades and also for controlling the side positioning of the frames on which the blades are mounted, as well as controlling the orientation of the blades.

DETAILED DESCRIPTION OF THE INVENTION

The various features and advantages of the present invention will be more readily understood when taken in conjunction with the following detailed description of the drawings in which:

FIG. 3 is a side sectional view of a mounting frame and cutting blade taken along lines 3—3 of FIG. 2;

FIG. 4 is a schematic diagram of a hydraulic control circuit used for selectively actuating and positioning the cutting blades;

FIG. 6 is a portion of a side elevational view of an alternative embodiment of mounting for the actuating cylinders; and FIG. 7 is a top plan view of a portion of this alternative embodiment.

Figure 1:
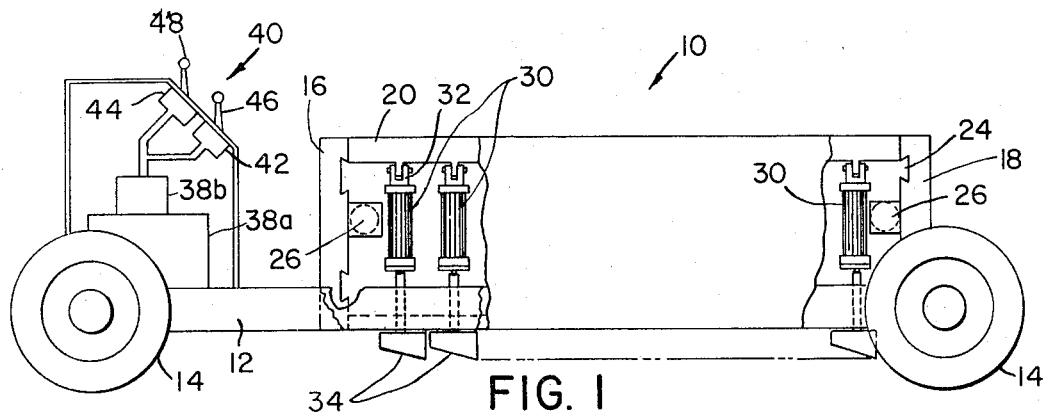
FIG. 1 is a side view, partly in section, of a pavement slicer constructed in accordance with my invention.
Figure 2:
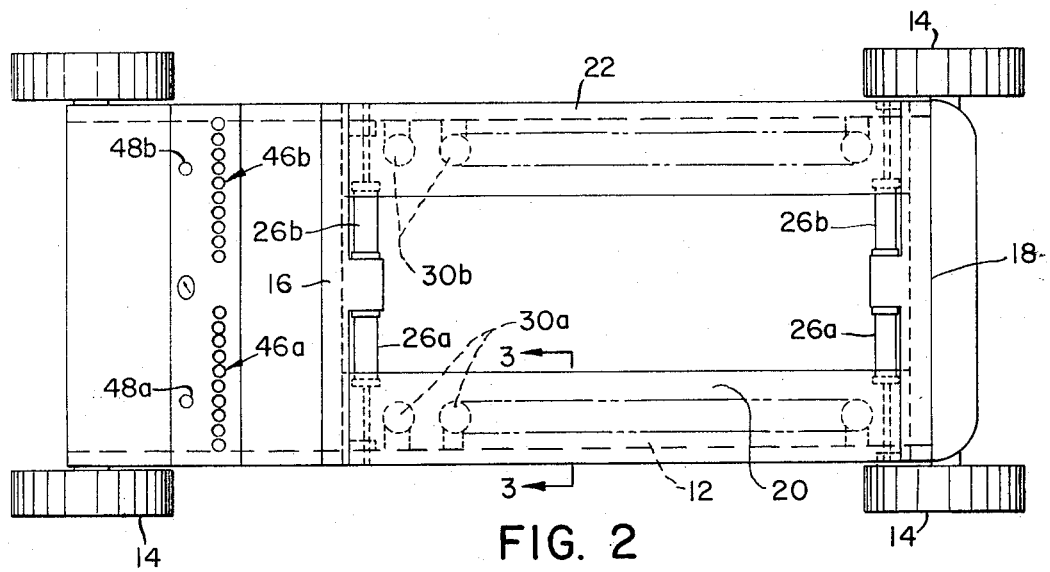
FIG. 2 is a top plan view of the pavement slicer of FIG. 1.

In FIGS. 1 and 2, a pavement slicer 10 according to the present invention has a platform or bed formed from beams 12 mounted on wheels 14 and carrying vertical struts 16, 18 in which frames 20, 22 are slideably mounted, for example, in dovetail joints 24. Hydraulic actuators 26 move the frames 20, 22 toward each other or away from each other for reasons described more fully below. The actuators 26a control the lateral position of the frame 20 while the actuators 26b control the lateral position of the frame 22.

Hydraulic actuators 30 are attached in groups to the frames 20 and 22 by means of a yoke and pin arrangement 32. The group 30a is attached to the frame 20, while the group 30b is attached to the frame 22. Cutting blades 34 are attached to the actuators 30 at the lower ends thereof. The actuators 30 are driven from a pressurized fluid source comprising a fluid reservoir 38a and a pump 38b. The pump 38b supplies fluid to the cylinders 30 and 26 through a control panel 40 comprising valve groups 42 and 44 under control of levers 46 and 48.

The operation of the control system will be understood more readily on reference to FIG. 4. As shown therein, pressurized fluid is supplied over a hydraulic supply line 50 to the actuators 30 through valves 42 and 44. The valves 42a and 42b control the operation of the hydraulic actuators 30a and 30b, respectively; when one of these valves is opened in response to the operation of the associated lever 46, the corresponding hydraulic actuator is energized to drive one of the blades 34 up or down as the operator desires. Similarly, the valves 44a and 44b are associated with the actuators 26a and 26b and are controlled by the levers 48a and 48b, respectively; when either of the valves 44 is opened, it drives the actuator 26 in one direction or the other in accordance with the setting of the levers 48. This controls the side placement of the frames 20 and 22 and therefore the lateral placement of the blades 34.

Figure 5A:
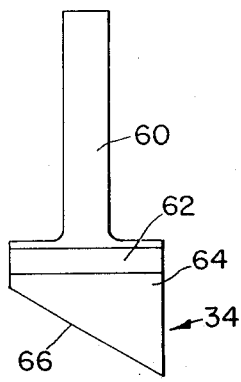
FIGS. 5a and 5b are side and end elevation views, respectively, of the cutting blade utiltized in practicing the invention.
Figure 5B:
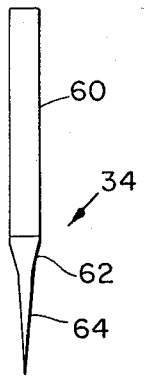

Referring now to FIGS. 5a and 5b, each blade 34 is formed from a shank 60, a beveled portion 62, and a blade portion 64 formed from two intersecting planes inclined at an angle with respect to each other. As seen from the side view of FIG. 5a, the blade 34 has an edge 66 that is tapered from front to rear. This assists in slicing through the pavement as will be more readily understood from the following discussion.

In operation, the pavement slicer 10 is brought to the location of the pavement section which is to be removed. For this purpose, the slicer may be towed to the desired location or may be provided with a self-contained engine so that it may move under its own motive power. When the slicer is positioned over the pavement section which is to be cut, the control levers 48 are operated to move the frames 30a and 30b laterally over the bed of the truck so as to space the blades 34 in accordance with the desired width of the cut to be made. The levers 46a and 46b are then set by the operator to actuate the blades 34 and thereby cut through the pavement. Where the pavement is very thick, or is of a very resistant material, so that a large force is required for cutting through it, the blades 34 should be driven into the pavement one by one so that the maximum force will be exerted on each blade during its cutting stroke.

This maximum force is, of course, limited only by the moment which the weight of the truck generates about one or the other set of wheels in response to the lifting action of the blade as it contacts the surface. By concentrating this force on one or, at most, a few blades, pavements of substantial thickness or substantial hardness (resistance to cutting) may easily be cut. For pavements of lesser thickness or lesser hardness, the hydraulic actuators 30 may be actuated in larger groups; in the limiting case, they may all be actuated simultaneously so that each blade cuts through the pavement at the same time.

The shape of the blade 34 provides additional cutting capability as compared to blades having a cutting surface which is not tapered in the direction of the cut. This results from the fact that only a portion of the cutting edge contacts the pavement at any time prior to the time that the initial cutting force is concentrated over a smaller cutting area. Accordingly, the cutting action is further enhanced.

As so far described, the pavement slicer forms generally rectangular strips having longitudinally extending sides which are severed from the adjacent pavement at all points along the sides except for small rib-like sections corresponding to the spacing between the blades. The ends transverse to the severed sides remain uncut. In many cases, cutting the rectangular slice in this manner will be sufficient to allow its subsequent removal by such machinery as a "bucket loader" or other machinery, especially if the lateral width of the rectangular slice is relatively small. When larger cuts are to be made, however, it may be desirable to further sever the rectangular slice to more readily enable its removal.

This may be accomplished quite simply by modifying the slicer shown of FIG. 1 so that the actuators 30, instead of being rigidly attached to the frames 20 and 22, are rotatably mounted thereon. One manner in which this may be accomplished is shown in FIGS. 6 and 7 of the drawings, which are side and top plan views, respectively, of a portion of the frame 20 having a cylindrical bolt 82 positioned in an aperture 84 extending through the frame 20 from top to bottom. A pin 86 extends through the shaft adjacent the lower edge of the frame 20; this limits the upward travel of the shaft when a load is applied to the blade. A second pin 88 extends through the lower end of the shaft and carries the hydraulic actuator 30 on it. An arm 90 (FIG. 7) extends from the head 82a of the shaft and is pivotally connected to a longitudinally extending bar 92 which, in turn, is pivotally connected through a driving arm 94 to a hydraulic actuator 96. The arm 94 is connected to the frame 20 through a pivot 98.

In normal operation, the hydraulic actuator 96 is positioned to orient the blade 36 in position a shown in dotted outline form in FIG. 7. When the blade 36 is to be positioned at right angles to its normal position, the actuator 96 is energized so as to rotate the connecting rod 94 in the clockwise direction. This, in turn, moves the arm 90 to the position shown in dotted outline form in FIG. 7 and the blade 36 then assumes the position b shown in FIG. 7. The actuators 30 are then actuated in the normal manner to force the blades 34 into the pavement and thereby slice the initial rectangular sectional cut into smaller segments which may more readily be removed by additional machinery.

From the foregoing, it will be seen that I have provided an improved machine for cutting pavement. The machine is efficiently constructed and readily and noiselessly cuts through a wide variety of pavement surfaces and thicknesses. Smooth, regular cuts may be formed quite rapidly with minimum disturbance of those in the vicinity of the apparatus.

Rectangular cuts of desired length from a minimum length equal to the length of a single blade to a maximum length equal to the overall length of all the blades and of a width ranging from a very narrow slice to a slice approximately equal to the width of the pavement slicer itself are easily formed. These rectangular slices may further be broken up into smaller pieces by the pavement slicer if desired.

Various other modifications of the invention will readily suggest themselves to those skilled in the art and it is therefore intened that the foregoing be taken as illustrative only and not in a limiting sense, the scope of the invention being defined in the claims.

I claim:
1. A pavement slicer for slicing through a pavement, comprising:
   (A) a frame having first and second frame members parallel to each other and spaced apart in a first direction,
   (B) a plurality of force applying members connected to each said frame member and aligned in a second direction transverse to said first direction,
   (C) a cutting blade connected to each force applying member for positioning above a pavement to be cut, the blades associated with each said frame member forming spaced cutting lines extending in said second direction, and
   (D) means for actuating selected ones of said force applying members to thrust said blades through said pavement.
2. A pavement slicer according to claim 1 in which said frame is carried on a wheeled mounting whereby said slicer may readily be propelled to the pavement to be sliced.
3. A pavement slicer according to claim 1 which includes means for rotating said blades a predetermined amount about a vertical axis whereby said blades may be forced through said pavement with selected orientations.
4. A pavement slicer according to claim 1 in which each said force applying member is independently operable at a controlled rate whereby each blade may be thrust against said pavement at a controlled rate.
5. A pavement slicer according to claim 4 in which means are provided for operating selectable force applying members simultaneously, whereby a cut of selectable length may be provided.
6. A pavement slicer according to claim 1 in which said frame members are slidably mounted in a frame element for motion in said first direction toward and away from each other to thereby establish cutting lines of differing widths for said blades.
7. A pavement slicer for slicing through a pavement at a controlled rate, comprising:
   (A) a frame having
      (1) a first fixed segment,
      (2) a second movable segment slidably mounted in said first fixed segment for movement in a horizontal direction therein,
   (B) a plurality of force applying members connected to said movable segment, and aligned along a longitudinal axis transverse to said horizontal direction,
   (C) a cutting blade connected to each force applying member for actuation in a vertical direction thereby, and
   (D) means for actuating said force applying means at a controlled rate to thereby thrust said blades through said pavement along a longitudinal cutting line.
8. A pavement slicer according to claim 7 in which each said force applying member includes an independently operable hydraulically actuated piston, whereby each said blade may be thrust against said pavement at a controlled rate.
9. A pavement slicer according to claim 8 in which the means for actuating the force applying means comprises:
   (A) a control panel mounted on a bed in common with said frame,
   (B) a plurality of control members for controlling corresponding hydraulic pistons,
   (C) a hydraulic reservoir, and
   (D) a plurality of fluid valves, each valve being operable by a corresponding control member to selectively connect the hydraulic piston to the fluid reservoir for actuation thereby.
10. A pavement slicer according to claim 9 in which said frame is transversely movable across said bed in response to the operation of a further fluid valve corresponding thereto, whereby a longitudinal cutting line may be selected.
11. A pavement slicer according to claim 9 which includes means for rotating said blades about a vertical axis whereby transverse slicing action may be obtained from said blades.
12. A pavement slicer according to claim 11 in which the means for rotating said blades comprises a hydraulic piston connected to each of said blades to rotate said blades when said piston is actuated.
13. A pavement slicer according to claim 7 in which each said blade comprises a shank portion for mounting said blade and a cutting portion having first and second intersecting surfaces forming a cutting line oriented at an angle to the pavement to be cut, whereby the portion of the cutting edge contacting the pavement surface during a cutting stroke is less than the entire length of said cutting line to thereby increase the cutting pressure during a cutting stroke.
14. A pavement slicer according to claim 7 which includes a third movable segment slidably mounted in said first fixed segment for motion in a horizontal direction toward and away from said second segment to thereby establish parallel spaced cutting lines of differing widths for said blades.

References Cited
UNITED STATES PATENTS

| | | | |
|---|---|---|---|
| 1,113,828 | 10/1914 | Pratt | 299—38 X |
| 435,973 | 9/1890 | Kruger | 299—38 |
| 1,644,582 | 10/1927 | Hargrave | 299—37 |
| 2,752,141 | 6/1956 | Silvestri | 173—24 X |

ERNEST R. PURSER, Primary Examiner

U.S. Cl. X.R.

173—24